(12) United States Patent
Kwoczek

(10) Patent No.: US 11,290,558 B2
(45) Date of Patent: Mar. 29, 2022

(54) METHOD FOR RETRIEVING A DATA STREAM FROM A SERVER AND TRANSPORTATION VEHICLE HAVING A NETWORK ACCESS POINT

(71) Applicant: VOLKSWAGEN AKTIENGESELLSCHAFT, Wolfsburg (DE)

(72) Inventor: Andreas Kwoczek, Lehre (DE)

(73) Assignee: Volkswagen Aktiengesellschaft

( * ) Notice: Subject to any disclaimer, the term of this patent is extended or adjusted under 35 U.S.C. 154(b) by 694 days.

(21) Appl. No.: 16/074,111

(22) PCT Filed: Sep. 2, 2016

(86) PCT No.: PCT/EP2016/070766
§ 371 (c)(1),
(2) Date: Jul. 31, 2018

(87) PCT Pub. No.: WO2017/133795
PCT Pub. Date: Aug. 10, 2017

(65) Prior Publication Data
US 2021/0105336 A1  Apr. 8, 2021

(30) Foreign Application Priority Data
Feb. 1, 2016 (EP) .................................... 16153635

(51) Int. Cl.
*H04L 67/5682* (2022.01)
*H04L 67/12* (2022.01)
*H04L 67/141* (2022.01)
(52) U.S. Cl.
CPC .......... *H04L 67/2852* (2013.01); *H04L 67/12* (2013.01); *H04L 67/141* (2013.01)
(58) Field of Classification Search
CPC .... H04L 67/2852; H04L 67/12; H04L 67/141
See application file for complete search history.

(56) References Cited

U.S. PATENT DOCUMENTS 8,279,884 B1 * 10/2012 Narasimha .............. H04L 47/22
370/412
8,976,782 B1  3/2015 Voit et al.
(Continued)

FOREIGN PATENT DOCUMENTS

CN  201303332 Y  9/2009
CN  102932438 A  2/2013
(Continued)

OTHER PUBLICATIONS

Liu et al.; Proxy Caching for Media Streaming over the Internet; IEEE Communications Magazine; Aug. 1, 2004; pp. 88-94; vol. 42, No. 8; IEEE Service Center; Piscataway, US.
(Continued)

*Primary Examiner* — Jonathan A Bui
(74) *Attorney, Agent, or Firm* — Barnes & Thornburg LLP

(57) ABSTRACT

A method for an application executed on a user terminal to retrieve a data stream from a server including a network access point in a transportation vehicle to receive a request from the application to the server to set up a connection between the application and the server, set up a first connection between the network access point and the application, and set up a second connection between the network access point and the server. The network access point requests and receives a first subset of the data stream from the server via the second connection and stores the first subset in a buffer store of the network access point. The network access point receives a request from the application to the server to send a second subset of the data stream to the application. The method sends the second subset of the data stream via the first connection.

26 Claims, 2 Drawing Sheets

(56) References Cited

U.S. PATENT DOCUMENTS

| | | | |
|---|---|---|---|
| 10,097,616 B2 * | 10/2018 | Walker | H04L 67/10 |
| 2012/0030361 A1 | 2/2012 | Spurgat et al. | |
| 2013/0227122 A1 * | 8/2013 | Gao | H04L 65/4084 |
| | | | 709/224 |
| 2014/0156863 A1 * | 6/2014 | Gao | H04L 65/4084 |
| | | | 709/231 |
| 2014/0254543 A1 | 9/2014 | Engelhard et al. | |
| 2015/0016244 A1 | 1/2015 | Moeller | |
| 2015/0067105 A1 * | 3/2015 | Zhu | H04L 65/601 |
| | | | 709/219 |
| 2015/0134754 A1 * | 5/2015 | Lauer | H04B 7/18506 |
| | | | 709/206 |
| 2015/0319241 A1 * | 11/2015 | Scott | H04L 67/2842 |
| | | | 709/214 |
| 2016/0119243 A1 * | 4/2016 | Song | H04L 47/365 |
| | | | 709/217 |
| 2017/0078729 A1 * | 3/2017 | Karlsson | H04L 67/12 |
| 2017/0303258 A1 * | 10/2017 | Zhang | H04W 8/005 |
| 2018/0227394 A1 * | 8/2018 | King | H04L 67/2861 |
| 2019/0364459 A1 * | 11/2019 | Lee | H04W 40/22 |
| 2020/0028931 A1 * | 1/2020 | Zhu | H04L 67/1097 |
| 2020/0267429 A1 * | 8/2020 | He | H04N 21/8456 |
| 2020/0349639 A1 * | 11/2020 | Mousseau | G06Q 20/027 |
| 2021/0021659 A1 * | 1/2021 | Takabayashi | H04N 21/845 |

FOREIGN PATENT DOCUMENTS

| | | |
|---|---|---|
| CN | 103298138 A | 9/2013 |
| CN | 103947231 A | 7/2014 |
| EP | 1011244 A2 | 6/2000 |
| EP | 2942971 A1 | 11/2015 |
| WO | 2007136621 A2 | 11/2007 |

OTHER PUBLICATIONS

Search Report for International Patent Application No. PCT/EP2016/070766; dated Sep. 26, 2016.

Office Action for Chinese Patent Application No. 201680080691.8; dated Jun. 22, 2020.

* cited by examiner

METHOD FOR RETRIEVING A DATA STREAM FROM A SERVER AND TRANSPORTATION VEHICLE HAVING A NETWORK ACCESS POINT

PRIORITY CLAIM

This patent application is a U.S. National Phase of International Patent Application No. PCT/EP2016/070766, filed 2 Sep. 2016, which claims priority to European Patent Application No. 16153635.4, filed 1 Feb. 2016, the disclosures of which are incorporated herein by reference in their entireties.

SUMMARY

Illustrative embodiments relate to streaming data in a transportation vehicle. Illustrative embodiments relate, in particular, to a method for retrieving a data stream from a server. Illustrative embodiments also relate to a transportation vehicle having a network access point.

BRIEF DESCRIPTION OF THE DRAWINGS

Exemplary embodiments are explained in greater detail below with reference to the accompanying figures, in which.

DETAILED DESCRIPTION

Figure 1:
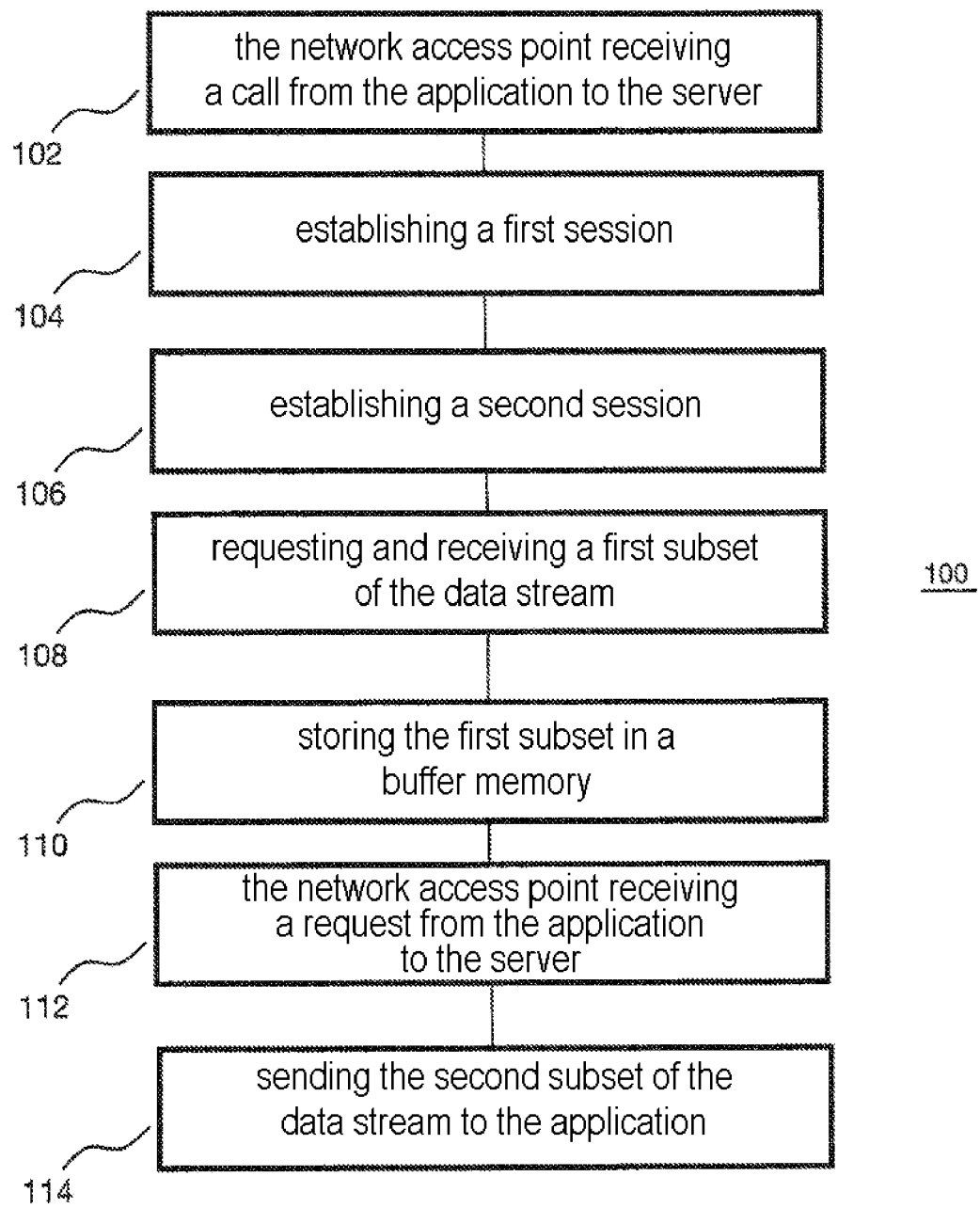
FIG. 1 shows a flow diagram of a method for retrieving a data stream from a server.

Digitization is growing ever more important even in transportation vehicles. Transportation vehicles can refer both to passenger transportation vehicles and to utility transportation vehicles. For instance, a transportation vehicle may be a car, a truck, a motor bike or a tractor. In general, a transportation vehicle can be regarded as a machine comprising an engine, a power train system and wheels. In addition to wanting access to music streams or video streams, transportation vehicle users also want to be able to download data from the Internet to a user terminal (e.g., smartphone, tablet computer or laptop).

Stable and high-rate connections to cellular networks (e.g., Universal Mobile Telecommunications System, UMTS, networks or Long Term Evolution, LTE, networks) are needed to be able to provide the aforementioned type of data services. The connection quality can sometimes be patchy in this context. When driving through areas of poor (low) network coverage, not only is the data rate low but sometimes the connection can even be lost. To even out periods of low data rate or periods in which the connection is lost, applications or software that retrieve a data stream from a server typically have a buffer memory for holding data available. In this context, however, the internal buffer memories of the applications or software are often very limited in size, with the result that the buffer memory may empty completely during longer periods of low data rate or during prolonged losses in connection. Consequently, a break in a music or video stream or in a download can occur. A user of such services in the transportation vehicle can find this annoying, especially if the user must perform additional operations to continue the music or video stream or resume the download.

It could therefore be desirable to a transportation vehicle user to improve, or design to be more robust, the data stream from the server to the application or software implemented on the user terminal.

Document U.S. Pat. No. 8,976,782 B1 shows a communication system for providing telephony communication across combined circuit-switched and packet-switched networks. The communication system comprises a plurality of gateways to guarantee the connectivity between the networks. There is nothing whatsoever in the document, however, to suggest designing a data stream from a server to an application or software to be more robust.

Document EP 1 011 244 A2 shows a method for redirecting a Hypertext Transfer Protocol (HTTP) connection request that is directed to a server to a proxy cache. There is nothing whatsoever in document EP 1 011 244 A2 either, however, to suggest designing a data stream from a server to an application or software to be more robust.

Documents US 2015/0016244 A1 and WO 2007/136621 A2 show a mobile router. When a user terminal seeks to establish a TCP session with a server, the mobile router establishes a first session between itself and the user terminal, and a second session between itself and the server. During a loss of connection between the mobile router and the server, it is hence possible to give the impression to an application on the user terminal that the connection to the server was continued. Even with the mobile router shown in documents US 2015/0016244 A1 and WO 2007/136621 A2, however, it is not possible to bridge prolonged periods of low data rate or losses in connection, and therefore ultimately there is nothing in these documents to suggest designing a data stream from a server to an application or software to be more robust.

Document EP 2 942 971 A1 proposes a method for streaming in a moving means of transport. Nevertheless, there is nothing whatsoever in document EP 2 942 971 A1 either to suggest making better utilization of a high-rate connection to a server.

Document XP 011115856 (Proxy caching for media streaming over the internet by Liu et al.) proposes buffering data from a stream in a proxy server. There is nothing whatsoever in document XP 011115856 either, however, to suggest designing a data stream from a server to an application or software in the vehicle to be more robust.

There is hence a requirement to provide a user of a transportation vehicle with an improved facility for retrieving a data stream from a server.

Disclosed embodiments provide a method for retrieving a data stream from a server by an application implemented on a user terminal. The method comprises a network access point, which is arranged in a transportation vehicle, receiving a call from the application to the server to establish a connection between the application and the server. Thus the connection of the user terminal to the server is meant to be established via the network access point located in the transportation vehicle. A network access point is generally a hardware component that allows a user terminal to connect to a selected network in accordance with one or more transmission standards. For instance, the network access point may be a router that is arranged in the transportation vehicle and allows the user terminal to link to a cellular network (e.g., a Universal Mobile Telecommunications System, UMTS, network or a Long Term Evolution, LTE, network) and hence to the Internet. The user terminal can be linked to the network access point by different transmission standards. For instance, the link can be made via a wireless local area network (WLAN) in accordance with the IEEE 802.11 standard, via a BLUETOOTH® connection or even via a near field communication (NFC) connection. Network access points that allow a user terminal to be linked via a WLAN are also known as WLAN hotspots.

The method also comprises establishing a first connection between the network access point and the application, and establishing a second connection between the network access point and the server. In other words, a direct connection is not established between the server and the application that is implemented on the user terminal. Instead, the connection is separated into two individual connections. A further degree of freedom for retrieving the data stream can be created by the separation into two separate connections.

The method therefore additionally comprises the network access point requesting and receiving a first subset of the data stream from the server via the second connection, and storing the first subset in a buffer memory of the network access point. For requesting the subset of the data stream, the network access point can draw on the information contained in the call from the application to the server. Thus the network access point can generate calls to the server which contain information for retrieving the data stream contained in the call from the application but which identify the network access point as the source of the call. Thus the network access point can request subsets of the data stream from the server independently of a data request by the application, and buffer the subsets in the buffer memory.

After the network access point receives a request from the application to the server to send a second subset of the data stream to the application, the second subset of the data stream, which second subset is comprised by the first subset, is sent from the buffer memory to the application via the first connection. The data held available in the buffer memory is thereby sent to the application. Hence the application can retrieve sufficient data even when the connection to the server is lost temporarily or there is a low instantaneous data rate between server and network access point.

In addition, the network access point requests further subsets of the data stream from the server at a frequency that is higher than the frequency at which it receives further requests from the application to the server to send a subset of the data stream to the application.

Thus separating the connection to the server into two connections opens a further degree of freedom. The flow control with respect to the server is no longer controlled by the application now but by the network access point. If the application currently requires little or no data (e.g., because its local buffer memory is full and it is working through this memory only slowly or not at all), relief can be provided by the network access point. This has a dedicated buffer memory available, and the server can be informed by flow control that further data is being accepted. The server can hence be prompted to send further data. If the mobile communications connection allows data transmission at this point in time, this can now be used to the benefit of the user of the user terminal for buffering data locally in the transportation vehicle. In the case of flow control by the application, a full application buffer would prevent the data being transmitted into the transportation vehicle, with the result that the local buffer memory of the application might empty completely, for instance, during a prolonged loss in connection. Assuming that the data were data from a music or video stream, the music stream or video stream would be interrupted or terminated. A frustrating experience of this kind for a user can hence be avoided.

By the network access point requesting data more frequently, it can be ensured, even when the subsets arriving at the network access point via the second connection are the same size as the subsets flowing out of the network access point via the first connection, that more data is stored in the buffer memory than flows out. In other words, the buffer memory is filled by the more frequent requests for data from the server. Better utilization of a high-rate connection between network access point and server is hence possible, with the result that a large amount of buffered (temporarily stored) data can be provided for retrieval by the application.

Furthermore, if the network access point identifies the server as the source of the second subset, the application moreover cannot detect that the data actually originates from the buffer memory. Thus the buffering of the server data is not apparent to the application. According to some exemplary embodiments, the network address of the server is therefore specified as the source network address of the second subset of the data stream. Thus for the application, the network access point effectively constitutes a transparent proxy. Since the network access point effectively constitutes a transparent proxy, there is also no need for any modifications to the server or to the application.

In some exemplary embodiments, the method comprises removing the second subset of the data stream from the buffer memory, and the network access point requesting and receiving a third subset of the data stream from the server via the second connection. The third subset follows within the data stream logically after the first subset. After the second subset is sent, it is immediately removed from the buffer memory to create memory space for storing further subsets of the data stream that are received from the server (e.g., the third subset). The third subset of the data stream can be requested and received before, during or after the second subset is removed from the buffer memory. This allows the buffer memory to continue to be filled regardless of the outflow of the data to the application.

According to some exemplary embodiments, the method also comprises the network access point receiving a call from the application to the server to send a fourth subset of the data stream to the application. The fourth subset within the data stream follows logically after the second subset, wherein the fourth subset is comprised by the rest of the first subset still stored in the buffer memory, by the rest of the first subset and of the third subset still stored in the buffer memory, or by the third subset. In addition, the method comprises sending the fourth subset of the data stream from the buffer memory to the application via the first connection. Thus the next data fragment needed can be provided when required to the application from the data stored in the buffer memory.

In some exemplary embodiments, the network access point requests further subsets of the data stream from the server at a frequency that is higher than the frequency at which it receives further requests from the application to the server to send a subset of the data stream to the application. By the network access point requesting data more frequently, it can be ensured, even when the subsets arriving at the network access point via the second connection are the same size as the subsets flowing out of the network access point via the first connection, that more data is stored in the buffer memory than flows out. In other words, the buffer memory is filled by the more frequent requests for data from the server. Better utilization of a high-rate connection between network access point and server is hence possible, with the result that a large amount of buffered (temporarily stored) data can be provided for retrieval by the application.

According to some exemplary embodiments, the first connection and/or the second connection can be based on the Internet Protocol (IP) and the Transmission Control Protocol (TCP). This can ensure that communication with all common servers and/or user terminals is guaranteed.

In some exemplary embodiments, as already intimated above, the first connection can be established via a wireless local area network (WLAN). This can ensure a high data rate between the network access point and the user terminals or the application. In addition, communication with all common user terminals can be guaranteed because these normally support WLAN connections. It is equally possible as well, however, that the second connection is established via a BLUETOOTH® connection, for instance.

According to some exemplary embodiments, as already intimated above, the second connection can be established via a cellular network (e.g., UMTS, LTE). Today, cellular networks cover large parts of the land, and therefore using a cellular network for the connection between network access point and server allows connectivity over a large area.

According to some exemplary embodiments, the data rate of the second connection between the network access point and the server may be higher than the data rate of the first connection between the network access point and the application. This can ensure that the buffer memory is filled with data received from the server faster than data is sent from the buffer memory to the application. It is hence possible to prevent the buffer memory of the network access point from emptying completely when data is being received from the server simultaneously with data being sent to the application.

In some exemplary embodiments, the first subset of the data stream may be larger than the second subset. In other words, larger subsets are received from the server than are output to the application. It is hence again possible to prevent the buffer memory of the network access point from emptying completely when data is being received from the server simultaneously with data being sent to the application.

According to some exemplary embodiments, the method can also comprise making the buffer memory available to the application by allocating memory space of a memory device of the network access point. The available memory space of the memory device of the network access point can hence be used dynamically and in a usage-adapted manner for making a buffer memory available to the application. The allocation can be used to make a plurality of buffer memories available to different applications. The size of a particular buffer memory can be preset or variable in this case. Thus the size of the buffer memory may be adapted, for example, to the type of the application. For instance, a buffer memory for a video-streaming application may be bigger than a buffer memory for a music-streaming application, because more data per unit of time must be transmitted for video streaming.

In some exemplary embodiments, the size of the buffer memory depends on an available memory space in the memory device. The memory device may be, for example, a hard disk, a flash memory, a solid-state device or a combination thereof. This can ensure, amongst other things, that when only a small amount of memory space is available, this space is not used entirely or almost solely for the buffer memory for a single application, as might be the case for a fixed size of the buffer memory. Instead, the size of the buffer memory can be scaled by the available memory space, so that even when there is little memory space available, a plurality of buffer memories can be made available in the memory device.

According to some exemplary embodiments, the size of the buffer memory ay also depend on a status of the cellular network, if the second connection is established via a cellular network. The status of the cellular network can be understood to mean an availability, a maximum data rate, a utilization, a latency, a jitter, etc. of the cellular network, or a combination thereof. Hence the buffer memory can be adapted variably to the actual conditions of the connection between network access point and server. Thus a buffer memory having adapted size can be made available depending on the status of the cellular network.

In some exemplary embodiments, the status of the cellular network is an instantaneous and/or a predicted, future status of the cellular network. The instantaneous status of the cellular network can be detected or determined, for instance, by the network access point itself or by another device of the transportation vehicle, which device can access the cellular network. In addition, relevant information can be provided by an operator of the cellular network or a manufacturer of the transportation vehicle. The predicted, future status of the cellular network represents a prediction of the future status of the cellular network. Such a status can be determined, for instance, in the transportation vehicle itself or by an online service of a manufacturer of the transportation vehicle from past measurements during operation of the transportation vehicle. Thus it is possible to determine a prediction of the probable status of the cellular network from past route data from the navigation system and measurements of the network status along the traveled route, for instance. When a route is traveled repeatedly or more frequently (e.g., to work and back), it is possible to make a reliable prediction of the supposed status of the cellular network along the route. On the other hand, it is equally possible for a network operator or a manufacturer of the transportation vehicle to provide information about the predicted, future status of the cellular network. Information about the instantaneous and/or future status of the cellular network can also be received, however, from other transportation vehicles by car-to-car communication. For instance, if a transportation vehicle ascertains a drop-out of the cellular network in a region, it can pass on this information to other transportation vehicles so that they can adapt their buffer memory accordingly. If the predicted, future status of the cellular network indicates, for instance, a drop-out or a low data rate along a part of the route, the buffer memory can be chosen to be larger, for example. Since the buffer memory is selected to be larger, enough data can be buffered to enable sufficient data to be provided to the application for the entire duration of the transit of that part of the route that has a poor data rate or no network reception.

The functionality described above can run on new, additional hardware components of the network access point (e.g., a WLAN hotspot) such as a CPU (central processing unit) and an SSD or the like. Of course, according to some exemplary embodiments, the functionality need not be implemented by an additional hardware component as an additional processor and an SSD or the like. According to some exemplary embodiments, it is also possible to implement the functionality by a simple software update for an existing CPU and/or an existing programmable hardware component and an existing memory. Therefore exemplary embodiments also include a program comprising a program code for performing the method described above when the program code runs or is executed on a computer, a processor or a programmable hardware component.

Another disclosed embodiment comprises a transportation vehicle having a network access point for an application implemented on a user terminal to retrieve a data stream from a server via the network access point. The network access point may be a WLAN hotspot in the transportation vehicle, for instance. The network access point comprises a buffer memory. The buffer memory can be made available to the application by allocating memory space of a memory device of the network access point, for instance. The memory device may be, for example, a hard disk, a flash memory, a solid-state device or a combination thereof. According to some exemplary embodiments, the buffer memory has a memory space between 100 Megabytes and 1.5 Gigabytes. Data for reproducing a video stream of length from about ten seconds up to several minutes can be buffered in a buffer memory of the size range, with the result that losses in connection between the network access point and the server lasting even several minutes can be bridged.

In addition, the network access point is configured to receive a call from the application to the server to establish a connection between the application and the server; moreover, to establish a first connection between the network access point and the application, and to establish a second connection between the network access point and the server. The network access point is also configured to request and receive a first subset of the data stream from the server via the second connection, and to store the first subset in the buffer memory. The network access point is also configured to receive a request from the application to the server to send a second subset of the data stream to the application. The second subset is comprised by the first subset. In addition, the network access point is configured to send the second subset of the data stream from the buffer memory to the application via the first connection.

When the disclosed transportation vehicle is used, a direct connection is not established between the server and the application that is implemented on the user terminal. Instead, the connection is separated by the network access point into two individual connections. A further degree of freedom for retrieving the data stream can be created by the separation into two separate connections. Thus the network access point can now request subsets of the data stream from the server independently of a data request by the application, and buffer the subsets in the buffer memory. In other words, data can be held available in the buffer memory and can be sent to the application when required. Thus even when the connection to the server is lost temporarily or there is a low instantaneous data rate between server and network access point, sufficient data can be held available for retrieval by the application until the connection to the server is restored or a higher data rate is achieved between server and network access point.

According to further exemplary embodiments, the network access point can be configured to perform one or more of the aforementioned further method operations.

FIG. 1 shows a method 100 for retrieving a data stream from a server by an application implemented on a user terminal.

The method 100 comprises a network access point, which is arranged in a transportation vehicle, receiving 102 a call from the application to the server to establish a connection between the application and the server.

The method 100 also comprises establishing 104 a first connection between the network access point and the application, and establishing 106 a second connection between the network access point and the server. Thus the retrieval of the data stream form the server is implemented by two separate connections instead of one single connection. A further degree of freedom for retrieving the data stream can be created by the separation into two separate connections.

The method 100 additionally comprises the network access point requesting and receiving 108 a first subset of the data stream from the server via the second connection, and storing 110 the first subset in a buffer memory of the network access point. Thus the network access point can request subsets of the data stream from the server independently of a data request by the application, and buffer the subsets in the buffer memory. A local temporary memory can hence be provided in the transportation vehicle for the server data.

In addition, the method 100 comprises the network access point receiving 112 a request from the application to the server to send a second subset of the data stream to the application. The second subset is comprised by the first subset. In response to the request, the method 100 comprises sending 114 the second subset of the data stream from the buffer memory to the application via the first connection. The data held available in the buffer memory can thereby be sent to the application. Thus even when the connection to the server is lost temporarily or there is a low instantaneous data rate between server and network access point, sufficient data can be held available for retrieval by the application until the connection to the server is restored or a higher data rate is achieved between server and network access point. The application can thereby be provided continually with sufficient data for retrieval.

Further details and properties of the method are described above in association with one or more exemplary embodiments. The method can comprise one or more optional features according to one or more of the exemplary embodiments described above.

Figure 2:
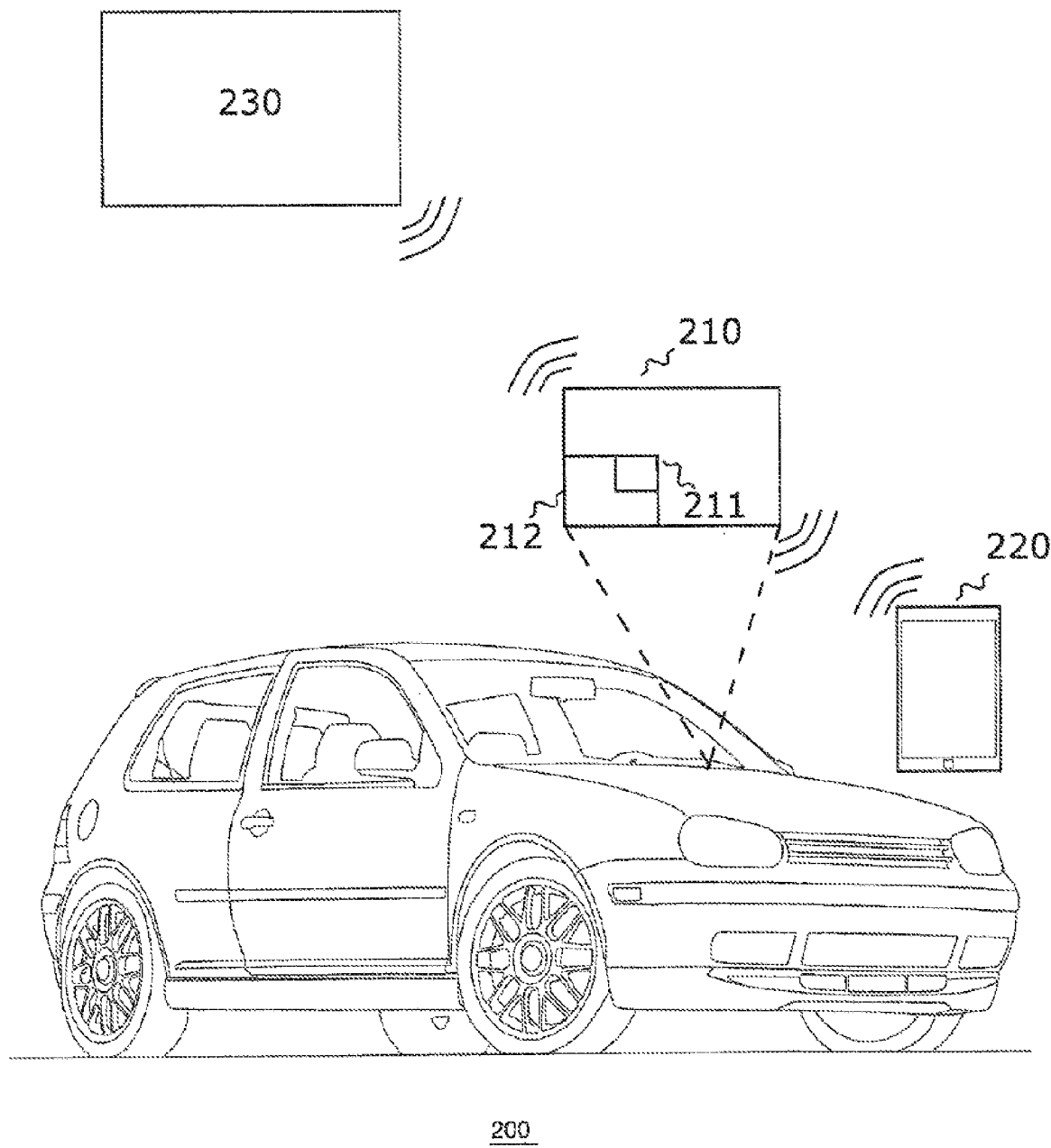
FIG. 2 shows an exemplary embodiment of a transportation vehicle.

FIG. 2 shows a transportation vehicle 200 comprising a network access point 210. For example, the network access point 210 may be a WLAN hotspot fitted in the transportation vehicle. The network access point 210 comprises a memory device 212 (e.g., a flash memory or an SSD).

If a user now wants to retrieve a data stream from a server 230 via an application of a user terminal 220 (e.g., a tablet, or a rear-seat entertainment apparatus arranged in the transportation vehicle 200), the network access point 210 can be used to ensure a robust data retrieval. For this purpose, the network access point 210 can communicate wirelessly both with the server 230 and with the user terminal 220. For example, the network access point 210 can be configured to communicate with the server 230 via a cellular network and with the user terminal 220 via a WLAN connection.

After the network access point 210 receives a call from the application to the server 230 to establish a connection between the application and the server 230, it establishes a first connection between the network access point 210 and the application. In addition, the network access point 210 establishes a second connection between the network access point 210 and the server 230. The first connection and the second connection are based here on IP/TCP, guaranteeing communication with all common servers and user terminals.

The network access point 210 then requests and receives a first subset of the data stream from the server 230 via the second connection. For requesting the data stream and for establishing the second connection, the network access point 210 can draw on the information contained in the call from the application to the server 230. The network access point 210 stores in a buffer memory 211 the first subset of the data stream received from the server 230. The buffer memory 211 is made available to the application by allocating memory space of the memory device 212.

If the network access point 210 now receives a request from the application to the server 230 to send to the application a second subset of the data stream, which second subset is comprised by the first subset, it sends the second subset of the data stream from the buffer memory 211 to the application via the first connection. Separating the connection to the server 230 into two connections opens a further degree of freedom. The flow control with respect to the server 230 is no longer controlled now by the application but by the network access point 210. In fact, the network access point 210 holds data available for the application in the transportation vehicle by the buffer memory 211. Thus the application can retrieve sufficient data even when the connection to the server 230 is lost temporarily or there is a low instantaneous data rate between server 230 and network access point 210. Assuming that the data were data from a music or video stream, it is possible to prevent an interruption or termination of the music stream or video stream in the event that the connection to the server 230 is lost or there is a low instantaneous data rate between server 230 and network access point 210.

The network access point 210 specifies the network address of the server 230 as the source network address of the second subset of the data stream. Thus for the application, the network access point 210 effectively constitutes a transparent proxy. Since the network access point 210 effectively constitutes a transparent proxy, the application assumes that the data is received directly from the server. Modifications to the application to suit the proposed method are therefore not needed.

In addition, the network access point 210 requests further subsets of the data stream from the server 230 at a frequency that is higher than the frequency at which it receives further requests from the application to the server 230 to send a subset of the data stream to the application. The network access point 210 in this case requests further subsets of the data stream from the server 230 until the buffer memory 211 is full. It can be ensured by the network access point 210 requesting data more frequently that more data is stored in the buffer memory 211 than flows out. A high-rate connection between network access point 210 and server 230 can hence be used to capacity, with the result that a large amount of buffered (temporarily stored) data can be provided for retrieval by the application.

The transportation vehicle 200 thus facilitates for a user of the transportation vehicle 200 improved and more resilient retrieval of a data stream from the server 230.

LIST OF REFERENCES

100 method for retrieving a data stream
102 receiving a call from the application to the server
104 establishing a first connection
106 establishing a second connection
108 requesting and receiving a first subset of the data stream
110 storing the first subset in a buffer memory
112 receiving a request from the application to the server
114 sending the second subset of the data stream to the application
200 transportation vehicle
210 network access point
211 buffer memory
212 memory device
220 user terminal
230 server

The invention claimed is:

1. A method for retrieving a data stream from a server by an application implemented on a user terminal, the method comprising:

establishing a first connection between a network access point in a transportation vehicle and the application;

the network access point in the transportation vehicle receiving a call through the first connection, the call including a request to be sent from the application to the server to establish a second connection between the application and the server;

establishing the second connection between the network access point and the server;

the network access point requesting a first subset of a data stream from the server through the second connection;

storing the first subset in a buffer memory of the network access point;

the network access point receiving a second request from the application to the server, the second request requesting the server to send a second subset of the data stream to the application, wherein the second subset includes the first subset;

sending the second subset of the data stream from the buffer memory of the network access point to the application through the first connection;

the network access point requesting that the server send further subsets of the data stream from the server, wherein this request and subsequent requests are made at a higher frequency than the network access point receives further requests from the application to the server.

2. The method of claim 1, further comprising:

removing the second subset of the data stream from the buffer memory; and the network access point requesting a third subset of the data stream from the server via the second connection, wherein the third subset within the data stream follows logically after the first subset, the network access point receiving the third subset of the data stream from the server via the second connection.

3. The method of claim 2, further comprising:

receiving by the network access point a request from the application to the server to send a fourth subset of the data stream to the application, wherein the fourth subset within the data stream follows logically after the second subset, and wherein the fourth subset includes the rest of the first subset still stored in the buffer memory, the rest of the first subset and of the third subset still stored in the buffer memory, or the third subset; and sending the fourth subset of the data stream from the buffer memory to the application via the first connection.

4. The method of claim 1, wherein the network access point requests further subsets of the data stream from the server until the buffer memory is full.

5. The method of claim 1, further comprising:

making the buffer memory available to the application by allocating memory space of a memory device of the network access point.

6. The method of claim 5, wherein the size of the buffer memory depends on an available memory space in the memory device.

7. The method of claim 5, wherein the second connection is established via a cellular network, and wherein the size of the buffer memory depends on a status of the cellular network.

8. The method of claim 7, wherein the status of the cellular network is an instantaneous and/or a predicted, future status of the cellular network.

9. The method of claim 1, wherein the first connection is established via a wireless local area network.

10. The method of claim 1, wherein the first connection and/or the second connection is based on the Internet Protocol and the Transmission Control Protocol.

11. The method of claim 1, wherein the data rate of the second connection between the network access point and the server is higher than the data rate of the first connection between the network access point and the application.

12. The method of claim 1, wherein the first subset is larger than the second subset.

13. The method of claim 1, wherein the network address of the server is specified as the source network address of the second subset of the data stream.

14. A transportation vehicle having a network access point for an application implemented on a user terminal to retrieve a data stream from a server via the network access point, wherein the network access point includes a buffer memory, and wherein the network access point:
  establishes a first connection between the network access point and the application;
  receives a call from the application to the server through the first connection, the call including a request to be sent from the application to the server to establish a second connection between the application and the server;
  establishes the second connection between the network access point and the server;
  requests and receives a first subset of the data stream from the server via the second connection;
  stores the first subset of the data stream in the buffer memory;
  receives a second request from the application to the server to send a second subset of the data stream to the application, wherein the second subset includes the first subset;
  sends the second subset of the data stream from the buffer memory to the application through the first connection; and
  requests further subsets of the data stream from the server at a higher frequency than the network access point receives further requests from the application to the server.

15. The transportation vehicle of claim 14, wherein the second subset of the data stream is removed from the buffer memory, the network access point requests a third subset of the data stream from the server via the second connection, wherein the third subset within the data stream follows logically after the first subset, and the network access point receives the third subset of the data stream from the server via the second connection.

16. The transportation vehicle of claim 15, wherein the network access point receives a request from the application to the server to send a fourth subset of the data stream to the application, wherein the fourth subset within the data stream follows logically after the second subset, wherein the fourth subset includes the rest of the first subset still stored in the buffer memory, the rest of the first subset and of the third subset still stored in the buffer memory, or the third subset, and wherein the fourth subset of the data stream is sent from the buffer memory to the application via the first connection.

17. The transportation vehicle of claim 14, wherein the network access point requests further subsets of the data stream from the server until the buffer memory is full.

18. The transportation vehicle of claim 14, wherein the buffer memory is made available to the application by allocating memory space of a memory device of the network access point.

19. The transportation vehicle of claim 18, wherein the size of the buffer memory depends on an available memory space in the memory device.

20. The transportation vehicle of claim 18, wherein the second connection is established via a cellular network, and wherein the size of the buffer memory depends on a status of the cellular network.

21. The transportation vehicle of claim 20, wherein the status of the cellular network is an instantaneous and/or a predicted, future status of the cellular network.

22. The transportation vehicle of claim 14, wherein the first connection is established via a wireless local area network.

23. The transportation vehicle of claim 14, wherein the first connection and/or the second connection is based on the Internet Protocol and the Transmission Control Protocol.

24. The transportation vehicle of claim 14, wherein the data rate of the second connection between the network access point and the server is higher than the data rate of the first connection between the network access point and the application.

25. The transportation vehicle of claim 14, wherein the first subset is larger than the second subset.

26. The transportation vehicle of claim 14, wherein the network address of the server is specified as the source network address of the second subset of the data stream.

* * * * *